United States Patent [19]

Fallon

[11] Patent Number: 4,913,260
[45] Date of Patent: Apr. 3, 1990

[54] GAS SILENCING SYSTEM WITH CONTROLLING SOUND ATTENUATION

[75] Inventor: Blaise M. Fallon, Saint-Dizier, France

[73] Assignee: Tenneco Inc., Lincolnshire, Ill.

[21] Appl. No.: 142,490

[22] Filed: Jan. 11, 1988

[51] Int. Cl.[4] .............................................. F01N 1/08
[52] U.S. Cl. .................................... 181/254; 181/228; 181/236; 181/239; 181/265; 181/272; 60/292; 137/487.5; 137/877; 251/127
[58] Field of Search ............... 181/228, 236, 239, 254, 181/265, 266, 272; 60/292, 324; 137/487.5, 861, 877; 251/127

[56] References Cited

U.S. PATENT DOCUMENTS

| | | | |
|---|---|---|---|
| 2,625,234 | 1/1953 | Fina | 181/254 X |
| 4,665,692 | 5/1987 | Inaba | 181/254 X |
| 4,690,163 | 9/1987 | Steinemann | 137/487.5 X |

Primary Examiner—Benjamin R. Fuller
Attorney, Agent, or Firm—Harness, Dickey & Pierce

[57] ABSTRACT

A gas silencing system for controlled sound attenuation of the exhaust gas in a motor vehicle comprises a sound attenuation muffler for exhaust gases. The system also includes means providing a bypass passage for gas to flow around at least part of the muffler. Bypass control valve is provided to allow selective regulation of the flow of exhaust through the muffler and the pass-pipe. The bypass control valve is responsive to a modulated pressure signal controlled by the driver of the vehicle. The invention also includes circuits for visually indicating the amount of bypass flow and the sound level of gas leaving the system.

30 Claims, 4 Drawing Sheets

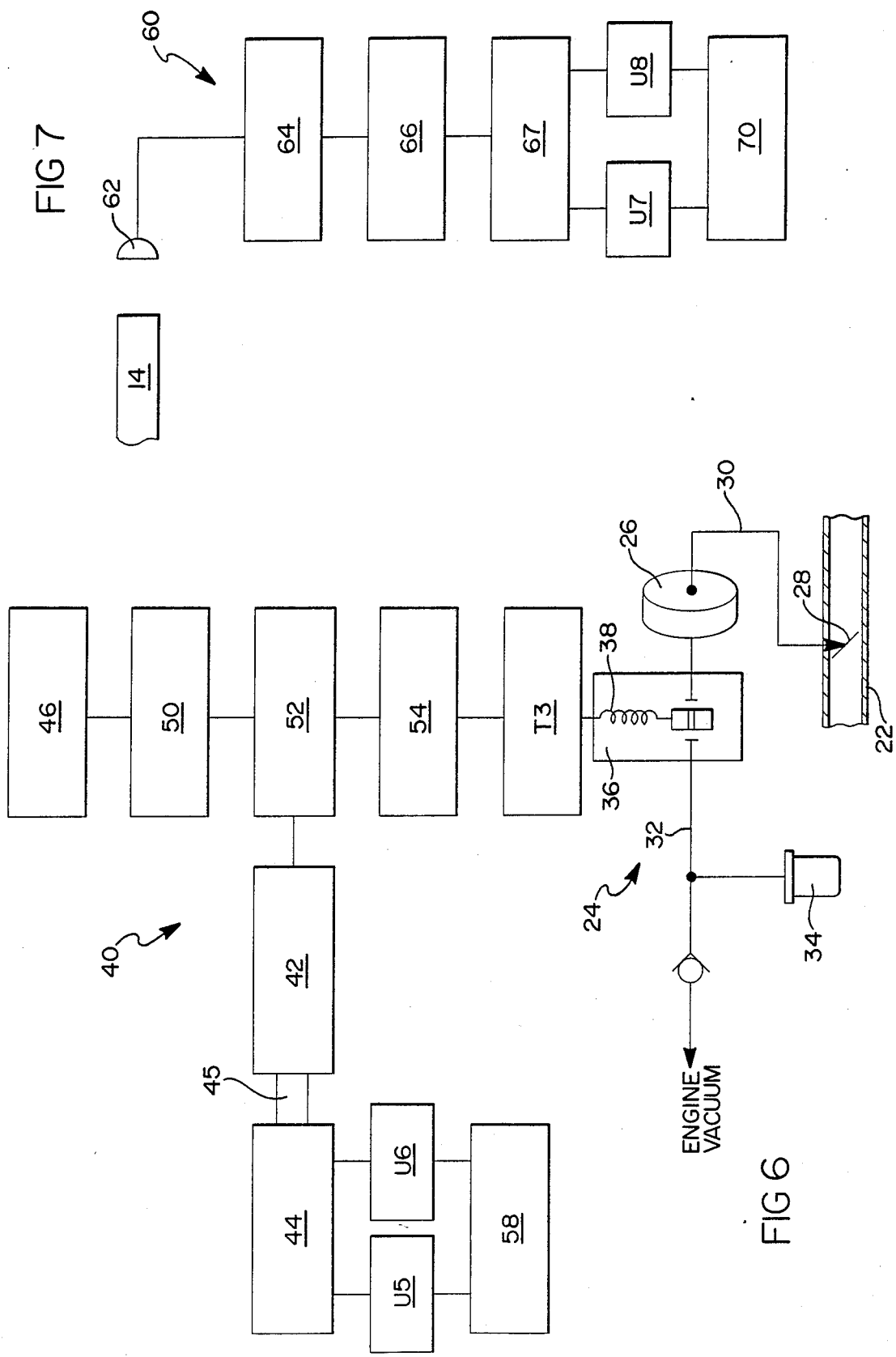

4,913,260

GAS SILENCING SYSTEM WITH CONTROLLING SOUND ATTENUATION

BACKGROUND OF THE INVENTION

This invention relates in general to sound attenuation systems for flowing gas. It is of particular value in connection with exhaust gas silencing systems for motor vehicles, especially automobiles and light trucks.

BRIEF SUMMARY OF THE INVENTION

It is an object of this invention to provide a gas flow silencing system having means for varying the attenuation of sound associated with gas flow in the system. It is also an object of the invention to provide a gas flow silencing system having means for controlling the amount of sound attenuation that occurs in the system and therefore the sound level of gas as it leaves the system. It is a more particular object of the invention to provide an exhaust gas system for automobiles and trucks having means whereby the driver of the vehicle may manually control the amount of sound attenuation in the system and receive an information display continuously indicating to him or her the amount of gas subjected to attenuation and the sound level of gas at the outlet of the system.

In a preferred embodiment for use in automobile exhaust systems or the like, the invention uses a sound attenuating muffler and provides a bypass conduit for gas to avoid flowing through a part of the muffler. A value in the bypass conduit controls flow through the conduit. The valve is driven by a fluid pressure responsive motor. This is preferably a vacuum motor connected to a source of vacuum, such as the intake manifold of the engine being silenced by the muffler. A modulating valve regulates the vacuum applied to the motor. A novel electronic circuit provides means for the driver to control the modulating valve, thereby controlling the vacuum motor and the position of the bypass valve and thus the amount of bypass gas flow and sound attenuation. The circuit includes an information display informing the driver of the amount of bypass flow. An additional electronic circuit measures the sound level of gas leaving the system and displays this information to the driver.

Other features, objects, and advantages of the invention will appear hereinafter.

DESCRIPTION OF THE DRAWINGS

FIG. 1A is a schematic diagram showing an application of the invention to a motor vehicle engine exhaust gas silencing system;

FIG. 6 illustrates the operation of the circuit shown in FIG. 4; and

FIG. 7 illustrates the operation of the circuit shown in FIG. 3.

DETAILED DESCRIPTION OF THE EMBODIMENT OF THE INVENTION

Figure 1:
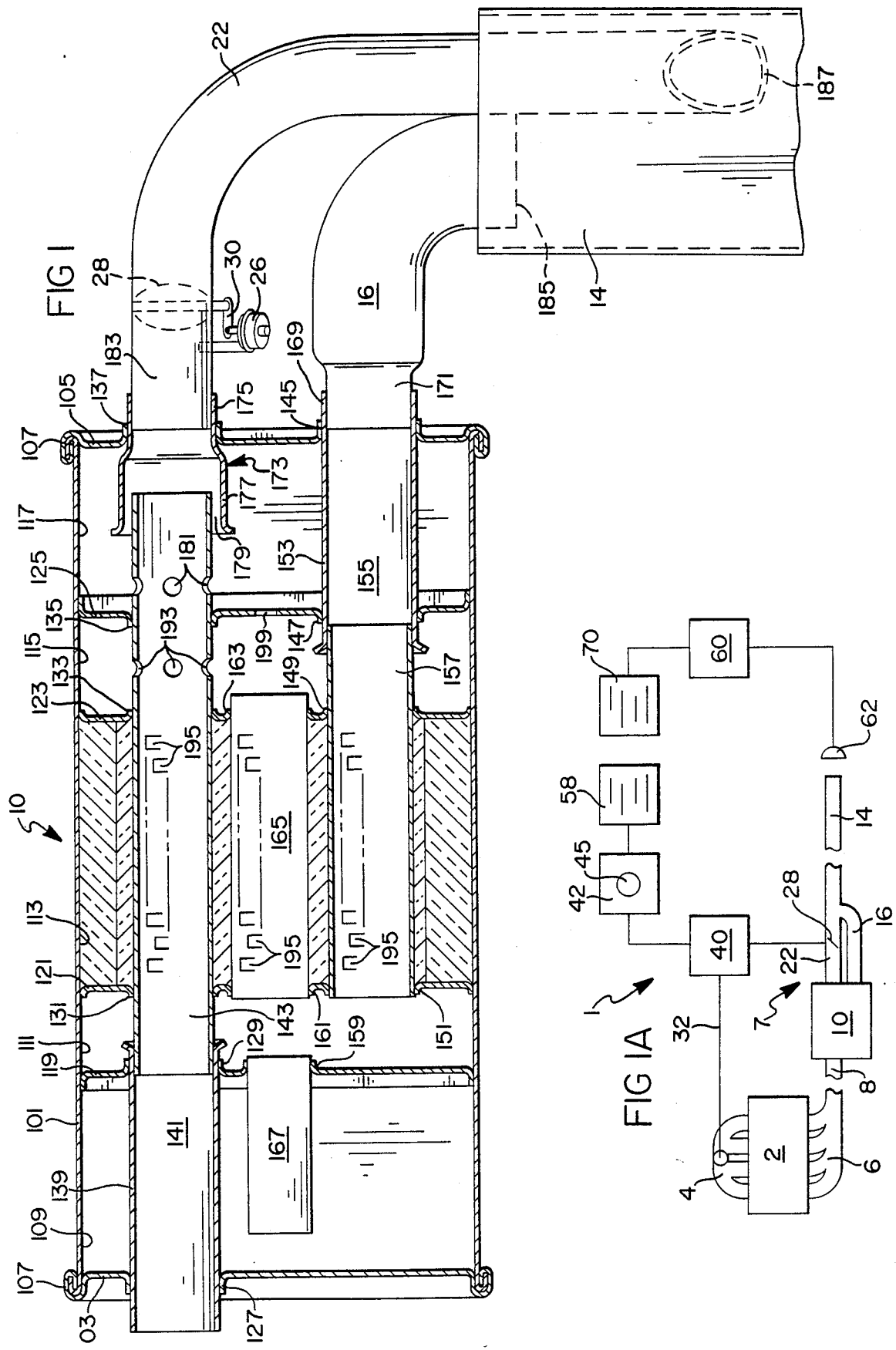
FIG. 1 is a sectional view of a typical muffler that may be used with the present invention.

Referring to FIG. 1A, a gas silencing system 1 embodying the invention is shown in connection with a motor vehicle internal combustion engine 2 having an air-intake manifold 4 and an exhaust gas manifold 6. An exhaust gas silencing system 7 for the engine 2 includes an exhaust pipe 8 delivering exhaust gas from the manifold 6 to the inlet of an exhaust gas sound attenuation muffler 10. Outlet means 12 for the muffler delivers exhaust gas to the tailpipe 14 which empties into atmosphere. In accordance with this embodiment of the invention, the outlet means 12 includes a normal outlet conduit 16 that delivers gas which has passed completely through muffler 10 to the tailpipe 14 while a bypass pipe or conduit 22 delivers gas which has not passed completely through muffler 10 (i.e., the gas has bypassed part of the sound attenuation means in muffler 10) to the tailpipe 14. A butterfly or other suitable valve element 28 in the bypass pipe 22 can be set by the driver of the vehicle at any position from wide open to fully closed and therefore controls the amount of exhaust gas flow through pipe 22. Since sound attenuation is inversely related to bypass flow, the driver is able to control the amount of sound in gas leaving the exhaust system 7. Back pressure of system 7 is reduced as bypass flow is increased and this tends to improve performance of the engine 2.

A bypass control valve circuit 40 controls the bypass valve element 28. This includes a control potentiometer 42 with a control knob and shaft 45 located in the driver's compartment of the vehicle so that it can be easily adjusted by the driver to adjust the position of the bypass valve element 28. A visual display 58 in the driver's compartment of the vehicle is connected to a part of the bypass valve control circuit 40 and provides graphic information to the driver with respect to the condition of the bypass system and the amount of the bypass flow. A visual display 70 in the driver's compartment provides graphic information to the driver regarding the sound level at the end of tailpipe 14, such sound being transformed into electrical impulses by the microphone 62 and into visual display signals by the circuit 60.

Figure 5:
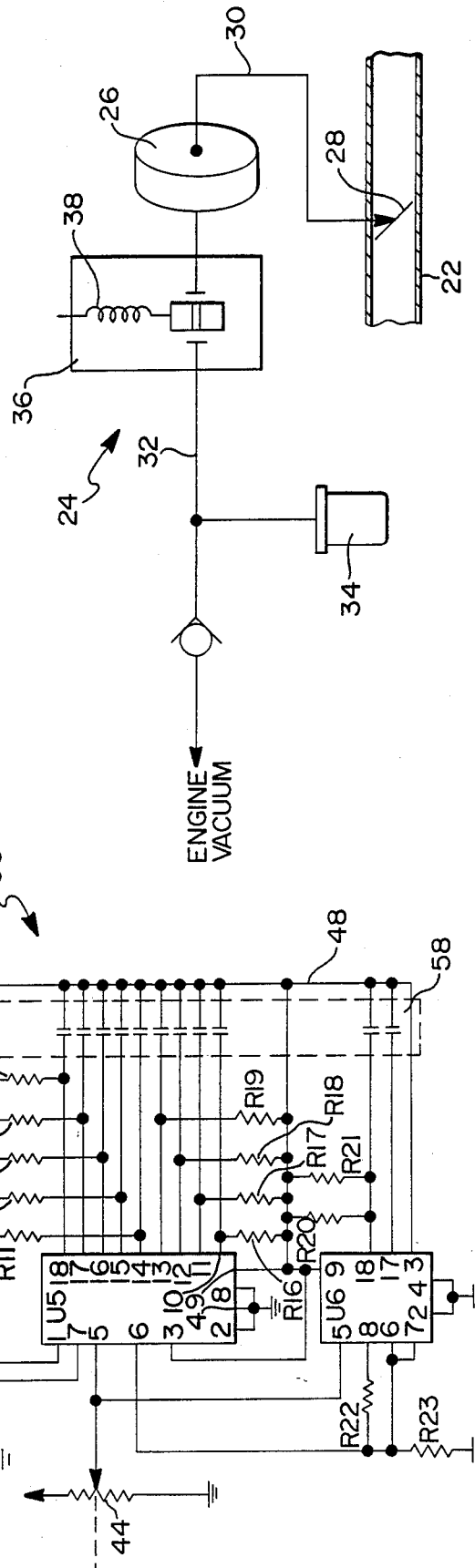
FIG. 5 illustrates the bypass control means used in the exhaust system.

As stated above, the driver of the vehicle with the present exhaust system can control the amount of bypass flow by simply turning a knob 45 in the driver's compartment. This acts through means to be described to set the position of by-pass valve control means 24 that controls valve element 28 as illustrated in FIGS. 5 and 6. The control means 24 includes a diaphragm motor 26. The diaphragm motor 26 is connected to the butterfly bypass valve element 28 in the bypass pipe 22 by means of a suitable mechanical linkage 30. The diaphragm motor 26 responds to vacuum delivered to it by a vacuum line 32 which is connected to the intake manifold 4 of the internal combustion engine 2. A vacuum accumulator 34 communicating with the vacuum line 32 reduces the impact of incremental changes in vacuum on the operation of the diaphragm motor 26.

The vacuum applied to the diaphragm motor 26 by the vacuum line 32 is modulated by a modulating vacuum control valve 36 to adjust the position of the diaphragm motor 26 and therefore the butterfly valve 28. The vacuum control valve 36 comprises a solenoid operated valve plunger 38 which is used to regulate the vacuum applied by the vacuum line 32 to the diaphragm motor 26 and therefore the pressure signals to which the motor 26 responds and is actuated. Pressure flow across the solenoid valve 38 is controlled by the bypass valve control circuit 40 described below (FIG. 4) so as to control the pressure differential on the diaphragm of the diaphragm motor 26.

Figure 4:
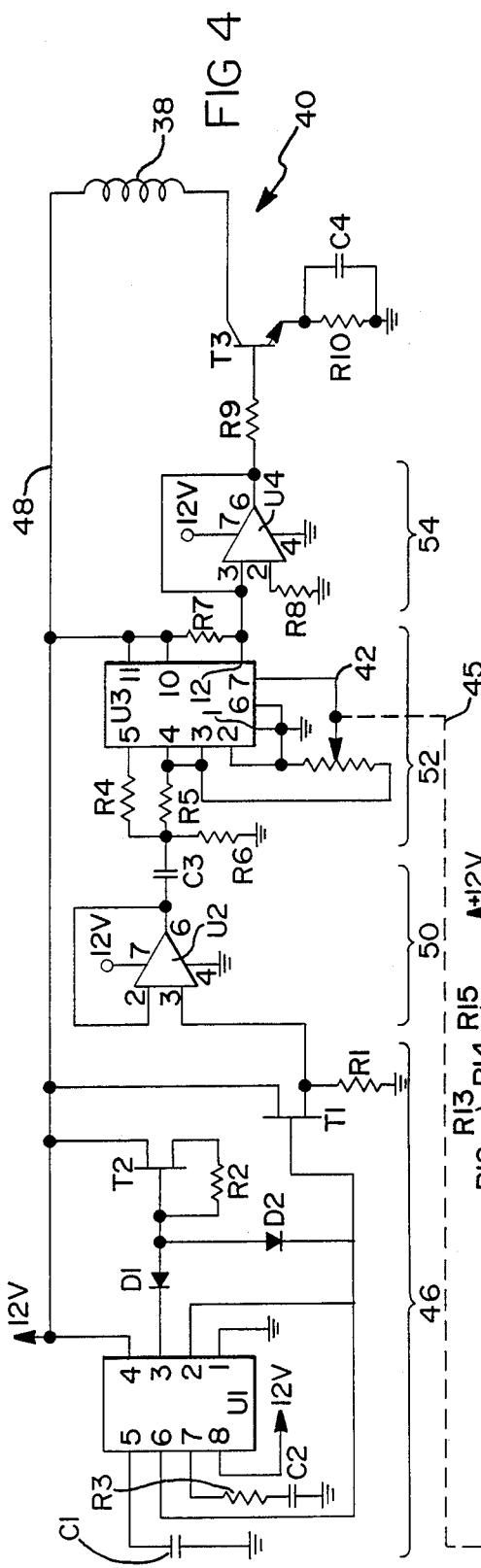
FIG. 4 is a schematic diagram of the circuit used for controlling the flow of exhaust gas through the exhaust system.

As seen in FIG. 4, the bypass control circuit 40 includes a first potentiometer 42 which is used to generate a controllable reference signal. This controls the solenoid valve 38 and thus the amount of exhaust flowing through the bypass pipe 22 in the manner described herein. The first potentiometer 42 is connected to a second potentiometer 44 by a common shaft 45, allowing the potentiometer 44 to be used in connection with an angular position indicator circuit to sense the degree of rotation of the potentiometer 42 as mentioned hereinafter.

To modulate the plunger of the solenoid 38, the bypass control circuit 40 further includes a sine wave oscillator circuit 46 having a timer U1. The timer U1 is driven by connecting the $V_{cc}$ pin 8 to a 12 volt supply bus 48, and connecting the GND pin 1 to ground. The VOLTAGE CONTROL pin 5 is connected to ground through a bypass capacitor C1 to prevent noise from altering the output of the timer U1. The RESET pin 4 is connected to the 12 volt supply bus 48 to avoid any possibility of falsely triggering the timer U1. Further, the DISCHARGE pin 7 is connected to ground through the resistor R3 and the capacitor C2. The THRESHOLD pin 6 and the TRIGGER pin 2 are connected to the gate of a first field-effect transistor T1. The OUTPUT pin 3 is connected to the gate of a second field-effect transistor T2 through a diode D1 and to the gate of a first field-effect transistor T1 through a diode D2. In addition, the source of the first field-effect transistor T2 is connected to the gate of the transistor T2 through the resistor R2. Because the second field-effect transistor T2 is connected in this manner, the second field-effect transistor T2 functions as a buffer.

When the OUTPUT pin 3 is high, the voltage delivered to the gate of the transistor T1 causes the transistor T1 to conduct, thereby producing a voltage across the resistor R1. Because the OUTPUT pin 3 is connected to the THRESHOLD pin and to the TRIGGER pin 2, a logical high voltage at the OUTPUT pin 3 produces a logical high voltage at the pins 2 and 6. The logical high voltage of the pins 6 and 2 causes the voltage at the OUTPUT pin 3 to decline, thereby bringing the transistor T1 out of conduction. While the timer U1 may be a LM 555 manufactured by National Semiconductor, other suitable timers may be used.

The output of the sine wave oscillator circuit 46 electrically communicates with a unity-gain buffer 50 having an operational amplifier U2. To drive the operational amplifier U2, the V+ pin 7 of the operational amplifier U2 is connected to the 12 volt supply bus 48 while the V− pin 4 is connected to ground. The operational amplifier U2 receives signals from the drain of the transistor T1 through its NONINVERTING INPUT pin 3. The OUTPUT pin 6 of the operational amplifier U2 is connected to the INVERTING INPUT pin 2. By using this configuration, the buffer 50 permits isolation of the timer U1 from the remainder of the bypass valve control circuit 40 described below. While the operational amplifier U2 may be a LM 741 manufactured by National Semiconductor, other suitable operational amplifiers may be used.

To compare the output of the first potentiometer 42 to the output of the unity-gain buffer 50 so as to generate a signal for controlling the solenoid 38, the bypass control circuit 40 further comprises a comparator circuit 52. The comparator circuit 52 includes a second timer U3 which receives the output of the operational amplifier U2 through a coupling capacitor C3. The capacitor C3 is connected to the $V_{REF}$ pin 4 through the resistor R5, as well as to the R/C pin 5 through the resistor R4. In addition, the capacitor C3 is connected to ground through the resistor R6. The second timer U3 includes an internal comparator which drives the base of an internal output transistor through an internal latching buffer. The collector of the internal output transistor is connected to the COLLECTOR pin 12 of the second timer U3, while the emitter of the internal output transistor is connected to the EMITTER pin 1. The output of the timer U3 when connected in the manner described below, is a 125 Hz pulse train having a pulse width determined by the signal delivered by the potentiometer 42 to the timer U3.

The timer U3 is drive by connecting the V+ pin 10 of the timer U3 to the 12 volt supply bus 48 while connecting the GND pin 6 to ground. the COLLECTOR pin 12 is also connected to the 12 volt supply bus 48 through the resistor R7. One end connector of the potentiometer 42 receives a voltage from the $V_{REF}$ pin 4 of the timer U3, which is internally connected to the output of an internal series regulator section of the timer U3. The other end connector of the potentiometer 42 is connected to ground. The wiper of the potentiometer 42 is connected to $V_{ADJ}$ pin 7 which is internally connected to the inverting input of the internal comparator of the timer U3. By manually adjusting the voltage delivered to the $V_{ADJ}$ pin 7 by moving the wiper of the potentiometer 42, the input voltage required to be delivered to the noninverting input of the internal comparator to have the internal comparator change states may be varied by the driver. The TRIGGER pin 3 of the timer U3 is tied to the $V_{REF}$ pin 4 so as to maintain an internal latching buffer in an unlatched state. The LOGIC pin 2 is connected to ground to ensure that the logic level generated at the output of the internal comparator is not inverted when it is delivered to the base of the internal output transistor. The BOOST pin 11 is connected to the 12 volt supply bus 48 so that the emitter current of the vertical PNP drivers in the differential stage of the internal comparator is increased, which increases the speed of the comparator.

To drive the solenoid valve 38, the output of the COLLECTOR pin 12 is delivered through a unity-gain buffer 54 to a complimentary silicon power transistor T3. The buffer 54 is used to isolate the transistor T3 from the comparator circuit 52 and comprises an operational amplifier U4 and resistors R8 and R9. To drive the operational amplifier U4, the V+ pin 7 of the operational amplifier U4 is connected to the 12 volt supply bus 48 and the V− pin 4 is connected to ground. The OUTPUT pin 6 of the operational amplifier U4 is delivered to the NON-INVERTING INPUT pin 3, and the INVERTING INPUT pin 2 is connected to ground through the resistor R8 to accommodate offset considerations. The operational amplifier U4 may be a LM 741 operational amplifier manufactured by National Semiconductor, although other suitable operational amplifiers may be used.

The collector of the transistor T3 is connected to one terminal of the solenoid 38 while the other terminal is connected to the 12 volt supply bus 48. The emitter of the transistor T3 is connected to ground through an RC circuit having a bypass capacitor C4 and a resistor R10 connected in parallel. Because the base of the transistor T3 is connected through the resistor R9 to the OUTPUT pin 6 of the operational amplifier U4, a voltage at the OUTPUT pin 6 causes the transistor T3 to conduct thereby activating the solenoid valve 38. Since the potentiometer 42 controls the pulse width of the signal delivered to the base of the transistor T3, the potentiometer 42 effectively controls the flow opening of the solenoid plunger 38 across line 32 which in turn regulates the differential pressure on the diaphragm valve 26 and thus the position of bypass valve element 28.

To indicate the angular position of the shaft 45 of the potentiometers 42 and 44, an angular position indicator circuit 56 is provided having a display 58. Because the angular position of the shaft 45 of the potentiometers 42 and 44 controls the position of the bypass valve element 28, the display 58 permits an optical indication of the relative amount of exhaust passing through the conduit 22. The display 58 comprises 12 vacuum fluorescent segments with one terminal of each segment connected to a 12 volt supply bus 48. The second terminal of each segment is connected to a plurality of pull-up resistors R11–R21. One lead of each of the pull-up resistors R11–R21 is connected to the 12 volt supply bus 48, while the other lead of each of the resistors R11–R21 is connected to the respective input terminals of the display 58. By connecting the resistors R11–R21 in this manner, the output voltage delivered to each segment of the display 58 is held at a voltage equal to or greater than the input transition level of the segment. While the display 58 may be a portion of a BG41 manufactured by Futaba, other suitable displays may also be used.

First and second display drivers U5 and U6 are provided to drive the display 58. Each of the display drivers U5 and U6 receive the output of the wiper of the potentiometer 44 through SIGNAL INPUT pin 5. The display drivers U5 and U6 convert the voltage at the wiper of the potentiometer 44, which is indicative of the angular position of the shaft of the potentiometers 42 and 44, into a responsive signal which is used to illuminate the display 58. The first display driver U5 is used to drive the first ten segments of the display 58, while the second display driver U6 is used to drive the remaining two segments of the display 58. To power the display drivers U5 and U6, the V+ pin 3 of the drivers U5 and U6 are connected to the 12 volt supply bus 48 while the V− pin 2 of each of the drivers U5 and U6 is connected to ground.

The display drivers U5 and U6 may be characterized as having a series of ten internal comparators, the output of which each drive the OUTPU pins 1, 10–18 of the respective driver. Each of the comparators is biased to a different comparison level by an internal resistor string having a series connection of ten 1 k ohm resistors each connected to one input of each comparator. One end of the internal resistor string is connected to the DIVIDER (HIGH END) pin 6 which receives a reference voltage from an internal voltage reference source. The other end of the internal resistor string is connected to the DIVIDER (LOW END) pin 4 which is connected to ground. The resistor string acts as a voltage divider with nodes between each resistor varying from adjacent nodes by a preselected percentage of the voltage difference between DIVIDER (HIGH END) pin 6 and DIVIDER (LOW END) pin 4. Accordingly, the output from each of the internal comparators will be responsive to the magnitude of the processed input signal from the potentiometer 44 relative to the voltage delivered to each comparator by the internal resistor string. In this configuration, the drivers U5 and U6 will cause the sequential illumination of each fluorescent segment in the display 58 upon receipt of a predetermined incremental increase in the voltage delivered to the SIGNAL INPUT pin 5. While the display drivers U5 and U6 may be an LM 3915 manufactured by National Semiconductor, other suitable drivers may be used.

To adjust the voltage delivered to the high end of each internal resistor string of the display drivers U5 and U6, a resistor R22 is provided. The resistor R22 is connected between the REFERENCE OUTPUT pin 7 and REFERENCE ADJUST pin 8 of the display driver U6. The resistor R22 is designed to allow adjustment of the output from the internal reference voltage source which is delivered to the high end of the resistor string at the DIVIDER (HIGH END) pin 6. To control the brightness of the display 58, the resistors R23 and R52 are connected between ground and the REFERENCE OUTPUT pin 7 of the display drivers U5 and U6 respectively. The resistors R23 and R52 are used to control the current drawn through the REFERENCE OUTPUT pin 7 which is related to the current drawn through each fluorescent segment of the display 58. By controlling the current drawn through each of the segments of the display 58, the brightness of the display 58 is achieved.

The MODE SELECT pin 9 of both of the drivers U5 and U6 is connected to the 12 volt supply bus 48 to permit interfacing between the display drivers U5 and U6 and the display 58. By connecting the MODE SELECT pin 9 in this manner, the internal comparator controlling the dot/bar logic circuit of the drivers U5 and U6 produces the requisite high signal to be compatible with the display 58.

Figure 3:
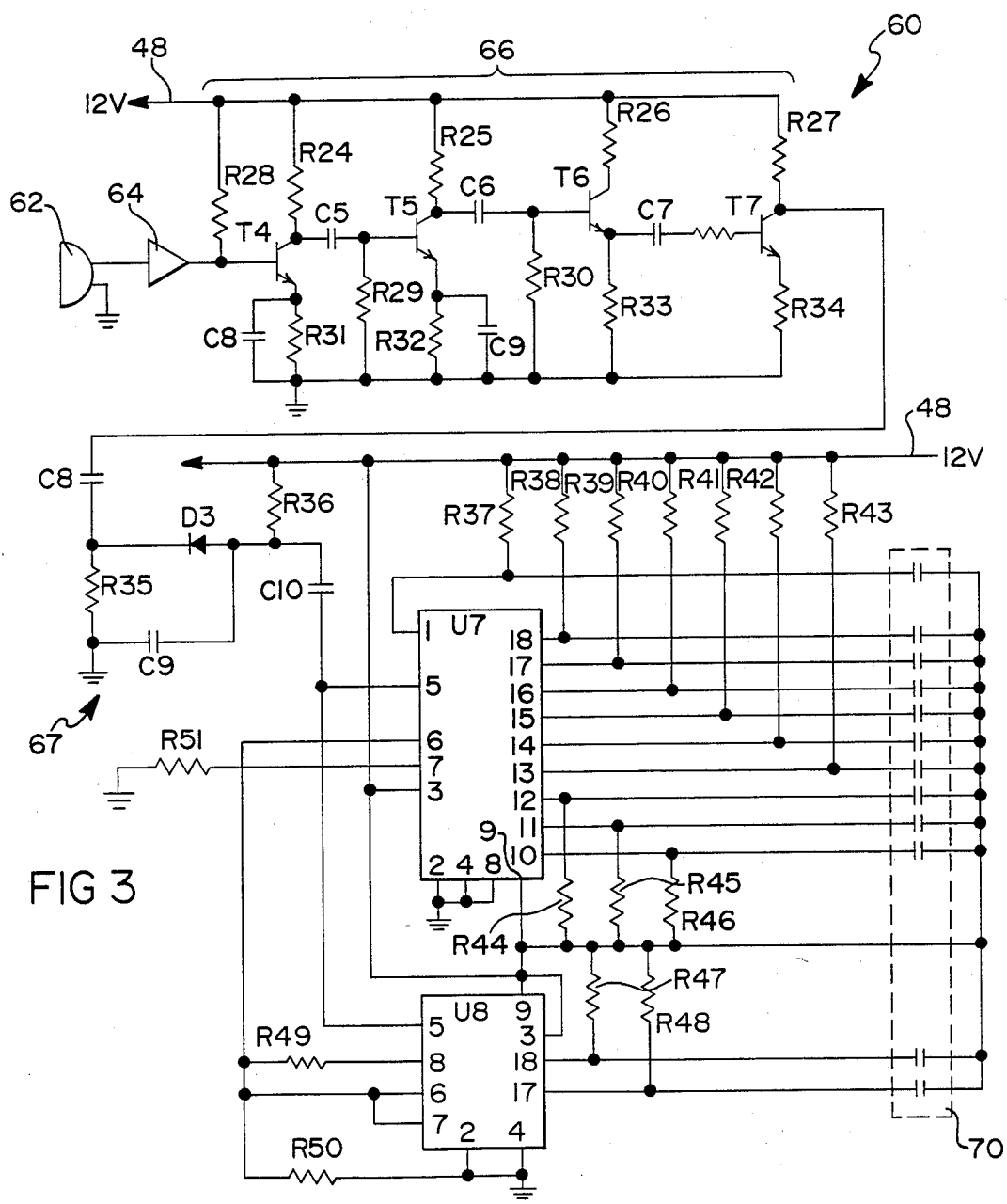
FIG. 3 is a schematic diagram of the circuit used to detect the intensity of sound emanating from an exhaust gas silencing system.

To optically indicate the sound level of exhaust gas leaving the tailpipe 14, a noise detection circuit 60 (FIG. 3) is provided. The noise detection circuit 60 includes a microphone 62 which is located near the tailpipe 14 of the muffler system 7. The microphone 62 generates electrical impulses in response to exhaust noise and delivers the impulses to a preamplifier 64. The output of the preamplifier 64 is delivered to a four-stage amplifier circuit 66 consisting of four transistors T4–T7. Output from each of the transistors T4–T7 is produced by the load resistors R24–R27 connected between the 12 volt supply bus 48 and the collectors of the transistors T4–T7, and is delivered to the next stage of the amplifier circuit 66 through a plurality of coupling capacitors C5–C7. The coupling capacitors C5–C7 are used to block passage of DC voltages and currents. To provide the appropriate bias to the base of each transistors T4–T7, a plurality of bias resistors R28–R30 is provided. The bias resistors R28–R30 are used to ensure that the proper operating potential is delivered to the base of each of the transistors T4–T7. A plurality of emitter resistances R31–R34 is also provided which are connected between the respective emitters of the transistors T4–T7 and ground, and a plurality of bypass capacitors C8, C9 is also connected between the emitters of the transistors T4, T5 and ground in parallel with the emitter resistances R31 and R32.

The output of the amplifier circuit 66 is delivered through a coupling capacitor C8 to a display driver interface circuit 67 comprising a plurality of resistors R35 and R36, a diode D3, and a bypass capacitor C9. Depending on the variation in noise received by the microphone 62, the current deliered through the resistor R36 from the 12 volt supply bus 48 to ground varies, thereby generating a voltage proportional to the noise received by the microphone 62. This voltage is then delivered to the display 70 and display drivers described below so that the noise received by the microphone 62 can be optically indicated.

The display 70 comprises twelve vacuum fluorescent segments with one terminal of each segment connected to a 12 volt supply bus 48. The second terminal of each segment of the display 70 is connected to a plurality of pull-up resistors R37–R48. One lead of each of the pull-up resistors R37–R48 is connected to the 12 volt supply bus 48, while the other lead of each of the resistors R37–R48 is connected to the respective input terminals of the display 70. By connecting the resistors R37–R48 in this manner, the output voltage delivered to the display 70 is held at a voltage equal to or greater than the input transition level of the segments of the display 70. While the display 70 may be a one-half of a BG41 manufactured by Futaba, other suitable displays may also be used.

To drive the display 70, the noise detection circuit 60 further comprises two display drivers U7 and U8. The display driver U7 is used to drive the first ten segments of the display 70, while the display driver U8 drives the remaining two segments of the display 70. The display drivers U7 and U8 receive an input signal from the resistor R36 at the SIGNAL INPUT pin 5 through a coupling capacitor C10. Each display driver U7 and U8 may be characterized as having a series of ten internal comparators, the outputs of which each drive the OUTPUT pins 1, 10–18 of the respective driver. Each of the internal comparators is biased to a different comparison level by an internal resistor string having a series connection of resistors. To adjust the reference voltage supplied to the high end of the internal resistor strings of each of the drivers, a resistor R49 is provided. The resistor R49 is connected between the REFERENCE OUTPUT pin 7 and the REFERENCE ADJUST pin 8 of the driver U8 and has a valve of 10 k ohms. The resistor R49 is designed to allow adjustment of the internal reference voltage which is delivered to the high end of the resistor string at the DIVIDER (HIGH END) pin 6. To drive the low end of the internal resistor strings in both of the drivers U7 and U8, the DIVIDER (LOW END) pin 4 of each of the drivers U7 and U8 is connected to ground. In this configuration, the drivers U7 and U8 will cause the sequential illumination of each fluorescent segments in the display 70 upon each 3 dB (decibel) increase in the sound signal deliverd to the SIGNAL INPUT pin 5. To drive the drivers U7 and U8, the V+ pin 3 of each of the drivers U7 and U8 is connected to the 12 volt supply bus while the Vhu − pin 2 of each of the drivers is connected to ground. While each of the drivers U7 and U8 may be an LM 3915 manufactured by National Semiconductor, other suitable drivers and displays may be used.

The brightness of the display 70 is controlled by the resistors R50 and R51 which are connected between ground and the REFERENCE OUTPUT pin 7 of each of the drivers U7 and U8 respectively. The resistors R50 and R51 are used to restrict the current drawn through the REFERENCE OUTPUT pin 7 of the drivers U7 and U8, which is related to the current drawn through each fluorescent segment of the display 70. By limiting the current drawn through each of the segments of the display 70 by means of the resistors R50 and R51, the brightness of the segments is determined.

Interfacing between the drivers U7 and U8 and the display 70 is permitted by connecting the MODE SELECT pin 9 of each of the drivers U7 and U8 to the 12 volt supply bus 48. By connecting the MODE SELECT pin 9 in this manner, the internal comparator controlling the dot/bar logic circuit of the drivers U7 and U8 produces the requisite high signal as to be compatible with the display 70.

The operation of the gas silencing system of the invention will now be described with reference to FIGS. 6 and 7. The comparator circuit 52 receives a sine wave from the sine wave generator circuit 46 through a unity-gain buffer 50. Further, the comparator circuit 52 also receives input from the potientiometer 42, the resistance of which is manually adjusted by the driver of the automobile through the shaft 45. The output from the comparator circuit is a 125 Hz pulse train having a pulse width determined by the resistance of the potientiometer 42. The output of the comparator circuit 52 is delivered to the solenoid valve 38 through the unity-gain buffer 54 and the transistor T3. The solenoid valve 38 responds to the width of the pulse train generated by the comparator circuit 52. The solenoid valve 38 is therefore able to regulate the size of the opening in vacuum control valve 36 of line 32 which regulates vacuum applied to the diaphragm motor 26 which in turn controls the position of the butterfly valve element 28. The degree to which the shaft 45 is rotated is optically displayed by the display 58 which receives the output from the potientiometer 44 through the display drivers U5 and U6.

Sound at the end of the tailpipe 14 is picked up by the microphone 62 which is connected to the preamplifier 64 and the amplifier 66. The output from the amplifier 66 is then delivered to the display 70 through the display driver interface 67 and display drivers U7 and U8 so that the noise from the tailpipe 14 may be optically displayed.

Control of bypass valve 28 as described above regulates flow through the muffler 10 and therefore the amount of sound attenuation. One form of exhaust gas muffler that may be used with the invention is illustrated somewhat schematically in FIGS. 1 and 2. This muffler has a tubular oval outer shell 101 which is closed at its inlet end by a transverse header 103 and at its outlet end by a transverse header 105, the headers being interlocked with the ends of the shell by means of gas tight joints 107. The space within the shell is subdivided into five inner chambers 109, 111, 113, 115, and 117 by four longitudinally separated transverse partitions 119, 121, 123, and 125.

Inlet header 103 and partitions 119, 121, 123, 125, and outlet header 105 have coaxially aligned collared openings 127, 129, 131, 133, 135, and 137, respectively. A first section 139 of inlet tube 141 is supported in collars 127 and 129 and a second section 143 of inlet tube 141 is supported in the downstream end of section 139 and in collars 131, 133, and 135.

Outlet header 105 and partitions 125, 123, and 121 have coaxially aligned collared openings 145, 147, 149, and 151, respectively. A first section 153 of outlet tube 155 is supported in the collars 145 and 147 and a second section 157 of outlet tube 155 is supported in the upstream end of section 153 and in collars 149 and 151.

Partitions 119, 121, and 123 have coaxially aligned collared openings 159, 161, and 163. A return flow tube 165 is supported at opposite ends in collars 161 and 163. A tuning tube 167 in chamber 109 is supported at one end in collar 159.

The outlet tube 155 extends outwardly of outlet header 105 to provide an outlet bushing section 169 that receives the necked down inlet end 171 of outlet conduit 16.

A bypass bushing 173 has a reduced diameter portion 175 supported in collar 137 of outlet header 105. Bushing 173 has an enlarged upstream end 177 that telescopes over the downstream end of inlet tube 141 and is radially spaced from it to provide an annular passage 179 connecting the open end of inlet tube 141 to the chamber 117. A set of openings 181 in the wall of tube section 143 also connect the inlet tube to the chamber 117. It is seen that inlet tube 141 along with pipe 22 may be regarded as a bypass passage for exhaust gas.

Figure 2:
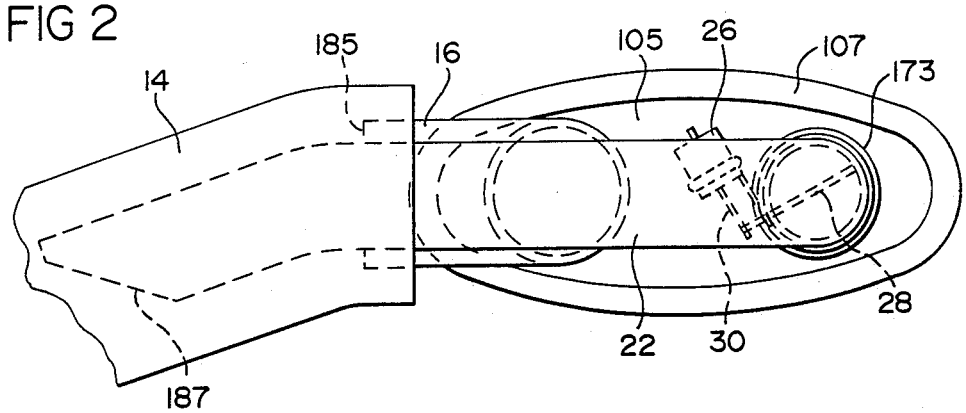
FIG. 2 is a side elevational view of the muffler shown in FIG. 1.

The upstream end 183 of bypass conduit 22 is supported in the portion 175 of bypass bushing 173. The butterfly valve element 28 is pivotally mounted in the upstream end 183 and diaphragm motor 26 may also be supported there (as shown in FIGS. 1 and 2) and operatively connected by linkage 30 to the valve 28.

The downstream end 185 of outlet conduit 16 opens into the upstream end of tailpipe 14 and the open downstream end 187 of bypass conduit 22 projects into the tailpipe 14 as shown.

In operation, if the butterfly valve 28 is fully closed exhaust gas entering and flowing through the inlet tube 141 will pass through openings 192 in tube section 143 to enter transverse chamber 115. It then enters the return flow tube 165 to flow back toward the inlet end of the muffler until it reaches transverse chamber 111. The only inlet and outlet to transverse chamber 109 is provided by tuning tube 167 so that the gas in chamber 111 will enter the outlet tube 155 and flow toward the outlet end of the muffler, into outlet conduit 16, and tailpipe 14. Portions of the tubes 141, 155, and 165 in transverse chamber 113 are preferably louvered as shown at 195 to connect the gas in the tubes with the chamber 113 which is preferably filled with a mass of fibrous sound absorbent material 197, such as glass fibers. High and medium sound frequencies, "spit" noise and roughness will therefore be attenuated in chamber 113. Chamber 109 with tube 167 can be tuned to attenuate a selected low frequency. Transverse partition 125 has several openings 199 in it so that gas from inlet tube 141 entering chamber 117 through openings 181 and annular passage 179 can flow into chamber 115 and then into return flow tube 165. This action of the gas along with the other flow reversals and changes in cross section of the gas flow path removes considerable energy from the gas and therefore produces sound attenuation. Thus, when the bypass element 28 is fully closed and all gas passes through the entire muffler 10, the sound level as it enters outlet conduit 16 and flows through tailpipe 14 will be low.

On the other hand, if the bypass valve 28 is wide open the resistance of pipe 22 to gas flow will be less than that of the return flow and outlet flow sections 165 and 155 of the muffler 10. Thus, substantially all gas will simply flow down inlet tube 141 (which may be considered to be a part of the bypass conduit), into bypass pipe 22, and then into the tailpipe 14. Some sound attenuation will occur in chambers 113 and 115 but a relatively large amount of sound, particularly low frequency sound, will remain in the gas.

The driver of the vehicle containing system 1 can by adjusting knob 45 select either of the two extremes just described as well as any intermediate condition in which gas flow from engine 2 will be split between bypass flow and full flow through the muffler 10. Sound attenuation will increase substantially in proportion to closure of valve element 28 and full flow through the muffler. Conversely, the low frequency sport sound and engine performance will increase substantially in proportion to opening of the valve 28. Thus, by turning the knob 45, the driver can, in effect, tune the engine 2 both as to sound and performance. To assist in this the amount of bypass flow will be continuously indicated to the driver on display 58 and the sound level of the exhaust system will be continuously indicated to the driver on display 70.

Modifications may be made in the specific structures and components described herein without departing from the spirit and scope of the invention. For example, other muffler structures than that of muffler 10 may be used and, if desired for particular applications bypass flow may completely exclude the muffler, i.e., go around it all together.

What is claimed is:

1. A gas silencing system for selectively attenuating sound in flowing gas such as in an exhaust system of a vehicle having an internal combustion engine, said gas silencing system having a gas inlet and a gas outlet, said system comprising:

a housing operable to receive gas from said gas inlet of said gas silencing system;

first gas flow means for receiving said gas and providing a first flow path through said gas silencing system, said first gas flow means being operable to receive gas entering said gas inlet of said gas silencing system and deliver gas to said gas outlet of said gas silencing system;

second gas flow means for receiving said gas and providing a second flow path through said gas silencing system, said second gas flow means being operable to receive gas entering said inlet of said gas silencing system and deliver gas to said gas outlet of said gas silencing system;

regulating means including powered means for selectively regulating and modulating over a range of flow the relative flow of gas through said first and second flow paths of said first and second gas flow means, said regulating means being responsive to a modulated pressure signal;

means for detecting and displaying sound levels of gas leaving the gas silencing system; and whereby said modulated pressure signal is able to selectively control the relative flow of said gas through said first and second gas flow means to thereby control the sound generated by said gas silencing system caused by gas flowing between said gas inlet and said gas outlet of said gas silencing system.

2. A system as set forth in claim 1, wherein said first gas flow means for receiving said gas is at least partially disposed within said housing.

3. A system as set forth in claim 2, wherein said second gas flow means for receiving said gas comprises a bypass pipe which is at least partially disposed within said housing.

4. A system as set forth in claim 3, wherein a portion of said bypass pipe is disposed within said muffler.

5. A system as set forth in claim 1, wherein said regulating means comprises a valve element at least partially disposed in the second gas flow means, vacuum powered means for operating the valve element, conduit means including an accumulator for connecting the powered means to a vacuum source, and modulator valve means for regulating pressure flow in the conduit means and thereby the position of the valve element.

6. A system as set forth in claim 1, wherein said regulator means comprises a bypass control valve communicating with said second gas flow means for receiving said gas, said bypass control valve being operable to selectively limit the flow of gas through said second gas flow means for receiving said gas.

7. A system as set forth in claim 6, wherein said bypass control valve comprises a vacuum control valve communicating with a vacuum source, said vacuum control valve having a solenoid operated by said modulated pressure signal.

8. A system as set forth in claim 7, wherein said bypass control valve further comprises a diaphragm motor communicating with said vacuum control valve.

9. A system as set forth in claim 8, wherein said bypass control valve further comprises a vacuum accumulator communicating with said vacuum source, said vacuum accumulator being operable to reduce the impact of incremental changes in the pressure delivered by said vacuum source on the operation of said diaphragm valve.

10. A system as set forth in claim 9, wherein said vacuum source is the intake manifold of said engine.

11. A system as set forth in claim 7, wherein said regulating means further comprises means for controlling said bypass control valve, said means for controlling said bypass control valve being operable to generate a control signal and deliver said control signal to said solenoid.

12. A gas silencing system for selectively attenuating sound associated with the exhaust gas of a vehicle having an internal combustion engine, said gas silencing system having a gas inlet and a gas outlet, said gas silencing system comprising:
a housing operable to receive exhaust gas from said gas inlet of said gas silencing system;
first gas flow passage means for receiving said exhaust from said engine and and providing a first flow path through said gas silencing system, said first gas flow passage means being operable to receive exhaust gas entering said gas inlet of said gas silencing system and deliver exhaust gas to said gas outlet of said gas silencing system;
second gas flow passage means for receiving said exhaust and providing a second flow path through said silencing system, said second gas flow passage means being operable to receive exhaust gas entering said gas inlet of said gas silencing system and deliver exhaust gas to said gas outlet of said gas silencing system;
bypass control valve means for selectively regulating and modulating the flow of exhaust through said first and second flow paths of said first and second gas flow passage means;
third means for controlling said bypass control valve means, said third means being operable to generate a cyclical signal having a selectable pulse width, said bypass control valve means being operatively connected to said third means and responsive to said pulse width;
means for detecting and displaying sound levels of gas leaving the gas silencing system; and
whereby the sound generated by said exhaust gas flowing between said gas inlet and said gas outlet of said gas silencing system is responsive to the pulse width of the signal generated by said third means for controlling.

13. A system as set forth in claim 12, wherein said third means for controlling said bypass control valve means includes means for generating a sinusoidal signal having a predetermined frequency.

14. A system as set forth in claim 12, wherein said third means for controlling said bypass control valve means includes comparator means for comparing the output of said means for generating a sinusoidal signal to a controllable reference signal, the output of said comparator means being responsive to the duration at which said sinusoidal signal exceeds said controllable reference signal.

15. A system as set forth in claim 14 wherein said bypass control valve means comprises a vacuum control valve having a solenoid, said valve being connected to a source of vacuum, a transistor electrically communicating with said comparator means and driving said solenoid to operate said vacuum control valve.

16. An apparatus for selectively attenuating sound in flowing gas having a gas inlet and a gas outlet, said apparatus comprising:
a housing operable to receive gas from said gas inlet of said apparatus;
first gas flow passage means for receiving said gas from said gas inlet of said apparatus and deliver gas to said gas outlet of said apparatus, said first gas flow passage means providing a first flow path through said apparatus;
second gas flow passage means for receiving said gas flow passage means including a bypass control valve responsive to a modulated pressure signal to modulate gas flow through the first and second path;
means for detecting and displaying sound levels of gas leaving said apparatus; and
means for generating said modulated pressure signal;
whereby the sound generated by gas flowing between said gas inlet and said gas outlet may be selectively attenuated by said modulated pressure signal.

17. The apparatus of claim 16, wherein said means for generating said modulated pressure signal comprises a vacuum control valve communicating with a vacuum source, said vacuum control valve comprising a solenoid operable to control the pressure delivered from said vacuum source to said bypass control valve.

18. The apparatus of claim 17, wherein said means for generating said modulated pressure signal further comprises means for generating a solenoid control signal having a controllable pulse width, said solenoid being responsive to the pulse width of said solenoid control signal.

19. The apparatus of claim 18, wherein said means for generating said modulated pressure signal further comprises oscillator means for generating a cyclical signal electrically communicating with a comparator means, said comparator means operable to generate said solenoid control signal in response to the duration of which the output of said oscillator means exceeds a predetermined voltage.

20. The apparatus of claim 19, wherein said means for generating a solenoid control signal further comprises means for selectively adjusting said predetermined voltage.

21. An exhaust gas sound attenuation system for power sources such as motor vehicle engines comprising a sound attenuation muffler having internal sound attenuation means, an inlet communicating with said attenuation muffler for receiving exhaust gas, a first conduit means mechanically communicating with said muffler providing an exhaust gas outlet passage for the exhaust gas that has passed through the sound attenuation means in the muffler, a second conduit means mechanically communicating with said muffler providing an exhaust gas bypass passage for the exhaust gas to bypass at least part of the sound attenuation means in the muffler, a valve mechanically communicating with the second conduit means for controlling flow of the exhaust gas through the second conduit means, said valve being movable between a fully closed position and a fully open position, a fluid pressure operated motor for controllably moving said valve between said fully closed and fully open position and to intermediate positions between said fully closed and said fully open position, said fluid pressure operated motor mechanically communicating with said valve, modulating valve means for controlling fluid pressure on said motor so as to control the position of said valve, and electronic control means for controlling operation of the modulating valve means so as to control the exhaust gas flow through the second conduit means, said electronic control means including means for detecting and displaying sound levels of gas leaving said exhaust gas sound attenuation system.

22. A system as set forth in claim 21 wherein said electronic control means includes manual control means for operation by the driver of the motor vehicle whereby the driver may regulate the position of the valve.

23. A system as set forth in claim 21 wherein said second conduit means includes a portion of the sound attenuation means in said muffler.

24. A system as set forth in claim 23 wherein said portion of the sound attenuating means provides attenuation of some medium and high frequencies in the exhaust gas but no substantial attenuation of low frequencies in the exhaust gas.

25. A system as set forth in claim 24 wherein said portion of the sound attenuation means is substantially straight and extends inside the muffler from one end of the muffler to the other end of the muffler.

26. A gas silencing system for selectively attenuating sound caused by flowing gas such as in an exhaust system of a vehicle having an internal combustion engine, said gas silencing system having a gas inlet and a gas outlet, said system comprising:
   a housing operable to receive gas from said gas inlet of said gas silencing system;
   first means for receiving said gas from said engine and providing a first flow path through said gas silencing system, said first gas flow path being operable to receive gas entering said gas inlet of said gas silencing system and deliver gas to said gas outlet of said gas silencing system;
   second means for receiving said gas from said engine and providing a second flow path through said gas silencing system, said first gas flow path being operable to receive gas entering said gas inlet of said gas silencing system and deliver gas to said gas outlet of said gas silencing system;
   regulating means for selectively regulating the relative flow of gas through said first and second flow paths of said first and second means for receiving said gas, said regulating means being responsive to a modulated pressure signal, said modulated pressure signal being operable to control the relative flow of gas through said first and second flow paths; and
   means for detecting and displaying the sound level of gas leaving said exhaust gas sound attenuation system.

27. A gas silencing system for selectively attenuating sound caused by flowing gas such as in an exhaust system of a vehicle having an internal combustion engine, said gas silencing system having a gas inlet and a gas outlet, said system comprising:
   a housing operable to receive gas from said gas inlet of said gas silencing system;
   first means for receiving said gas from said engine and providing a first flow path through said gas silencing system, said first means for receiving said gas being operable to receive gas entering said gas inlet of said gas silencing system and deliver gas to said gas outlet of said gas silencing system;
   second means for receiving said gas from said engine and providing a second flow path through said gas silencing system, said second means for receiving said gas being operable to receive gas entering said inlet of said gas silencing system and deliver gas to said gas outlet of said gas silencing system;
   regulating means for selectively regulating the relative flow of gas through said first and second flow paths of said first and second means for receiving said gas, said regulating means being responsive to a modulated pressure signal, said modulated pressure signal being operable to control the relative flow of gas through said first and second flow paths; and
   means for optically indicating the amount of said gas received by said second means for receiving said gas.

28. A gas silencing system for an exhaust of a vehicle having an internal combustion engine, said gas silencing system having a gas inlet and a gas outlet and comprising:
   a housing operable to receive gas from said gas inlet of said gas silencing system;
   first means for receiving said exhaust from said engine and providing a first flow path through said gas silencing system, said first gas flow means being operable to receive gas entering said gas inlet of said gas silencing system and deliver gas to said gas outlet of said gas silencing system;
   second means for receiving said exhaust from said engine, said second gas flow means being operable to receive gas entering said inlet of said gas silencing system and deliver gas to said gas outlet of said gas silencing system;
   bypass control valve means for selectively regulating the flow of exhaust through said first and second flow paths of said first and second means for receiving said exhaust; and
   control means for controlling said bypass control valve means, said control means being operable to generate a cyclical signal having a selectable pulse width, said bypass valve control means being operatively connected to said control means and responsive to said pulse width; and means for optically indicating the amount of said exhaust flowing through said second means for receiving said exhaust.

29. An exhaust gas sound attenuation system for a vehicle having a driver comprising a sound attenuation muffler having internal sound attenuation means and an inlet for receiving gas, a first conduit means providing an exhaust gas outlet passage for gas that has passed through the sound attenuation means in the muffler, a second conduit means providing an exhaust gas bypass passage for gas to bypass at least part of the sound attenuation means in the muffler, a valve controlling flow of gas through the second conduit means and movable between a fully closed position and a fully open position, said valve mechanically communicating with said second conduit means, a fluid pressure operated motor for moving the valve between said fully open and fully closed positions as well as intermediate positions between said fully open and fully closed positions, said fluid pressure operated motor mechanically communicating with said valve, modulating valve means controlling fluid pressure on said motor and therefore the position of the valve, said modulating valve means communicating with said valve, and electronic control means for controlling operation of the modulating valve means, said electronic control means electrically communicating with said modulating valve means, said electronic control means including manual control means for operation by said driver of the vehicle whereby the driver may regulate the position of the valve, the electronic control means including an optical display providing visual information to the driver regarding the position of the valve.

30. An exhaust gas sound attenuation system for for a vehicle having a driver comprising a sound attenuation muffler having internal sound attenuation means and an inlet for receiving gas, first conduit means providing an exhaust gas outlet passage for gas that has passed through the sound attenuation means in the muffler, a second conduit means providing an exhaust gas bypass passage for gas to bypass at least part of the sound attenuation means in the muffler, a valve controlling flow of gas through the second conduit means and movable between a fully closed position and a fully open position, said valve mechanically communicating with said second conduit means, a fluid pressure operated motor for moving the valve between said position and to any intermediate position, said fluid pressure operated motor mechanically communicating with said valve, modulating valve means controlling fluid pressure on said motor and therefore the position of the valve, said modulating valve means communicating with said valve, and electronic control means for controlling operation of the modulating valve means, said electronic control means electrically communicating with said modulating valve means, said electronic control means including manual control means for operation by said driver of the motor vehicle whereby the driver may regulate the position of the valve, the electronic control means including an optical display for indicating the sound level of gas leaving the system and means responsive to the sound level of gas leaving the system for operating said optical display.

* * * * *